Jan. 8, 1946.  M. WATTER  2,392,788
AIRCRAFT STRUCTURE
Filed Sept. 14, 1942
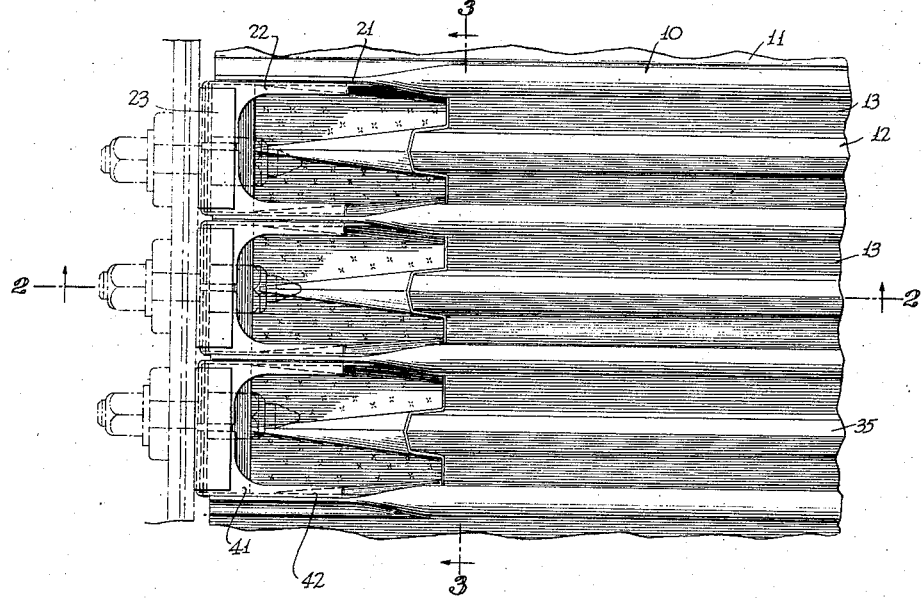
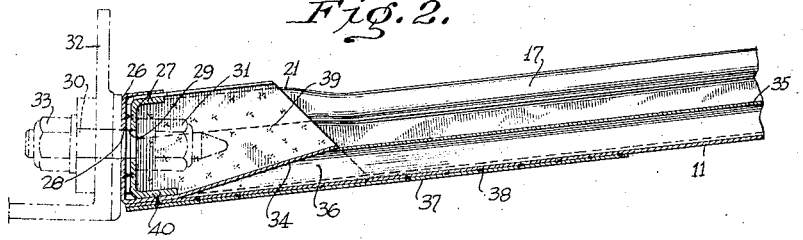
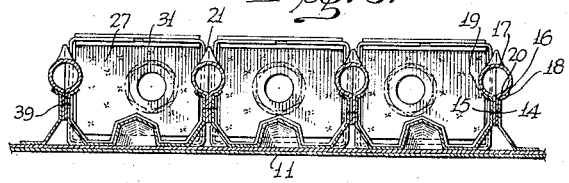
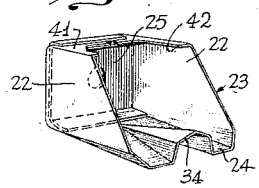
INVENTOR
*Michael Watter*
BY *John P Jarbox*
ATTORNEY Patented Jan. 8, 1946

2,392,788

UNITED STATES PATENT OFFICE 2,392,788

AIRCRAFT STRUCTURE

Michael Watter, Philadelphia, Pa., assignor to Edward G. Budd Manufacturing Company, Philadelphia, Pa., a corporation of Pennsylvania Original application March 26, 1941, Serial No. 385,235. Divided and this application September 14, 1942, Serial No. 458,250

3 Claims. (Cl. 244—117)

This invention relates to airfoil structures and more particularly to the means for connecting together airfoil structures of the skin-stressed type. This application is a division of my pending application Serial No. 385,235, filed March 26, 1941, relating to aircraft structure.

It is the object of the present invention to provide a novel mounting means for forming the attaching end of an airfoil structure of the skin-stressed type, which is simple in its formation and which can be easily secured with the skin sheet and its supporting structure.

It is another object of the present invention to provide a mounting means adapted to be formed on an end of a skin blanket assembly which can be connected to the skin sheet and its supporting structure by the same welding operation which connects portions of the supporting structure with the skin sheet.

It is another object of the invention to provide a mounting element which can be readily fitted within channel-shaped elements which serve for supporting the skin sheet and one which can be connected to the web portion of the channel as well as to the side portions thereof.

According to the present invention the supporting structure for the skin sheet is pre-shaped at its attaching end so that it may receive cup-shaped mounting elements of the form prescribed by this invention. Alternate tubular or hollow portions of the supporting structure are flattened at this location so that the side portions of the mounting element may be fit flush with the walls of the channel-shaped elements. The tubular portions are of the stringer type and have radially extending flanges adapted to be disposed between adjacent side faces of the channel-shaped elements for the purpose of being secured by the same welding operation that secures the side portions of the mounting element to the side portions of the channel-shaped supporting elements. The web of the channel-shaped reinforcing elements has a rib formation intermediate the side portions of the same, and the mounting elements have one of their side portions indented to receive the rib formation of the reinforcing element.

For other objects and for a better understanding of the invention, reference may be had to the following detailed description taken in connection with the accompanying drawing, in which, Figure 1 is a fragmentary plan view looking at the inner side of a skin blanket assembly, and showing the connection of the mounting elements to the skin reinforcing structure;

Fig. 2 is a sectional view running spanwise of the skin blanket assembly and taken along the line 2—2 of Fig. 1;

Fig. 3 is a sectional view taken chord-wise of the air-foil structure and along the line 3—3 of Fig. 1; and Fig. 4 is a perspective view of one of the mounting elements.

Referring now to the Figs. 1, 2 and 3, there is shown generally a skin blanket assembly 10, including a skin sheet 11 and a reinforcing or supporting structure 12 which is rigidly attached to the skin sheet. The supporting structure 12 includes a series of channel-shaped elements 13 running parallel to each other and spanwise of the airfoil structure. Each of these channel-shaped elements has inwardly extending side portions 14 and 15, arranged to be respectively adjacent to one another and between which there is disposed radially extending portions 16 of tubular or hollow reinforcing stringers 17. Each of the side portions 14 and 15 has opposing seat portions 18 and 19 respectively on which is seated a rounded face 20 of the tubular stringers 17.

Adjacent the attaching end of the airfoil structure these tubular stringers 17 are flattened, as indicated at 21 and the seat portions 18 and 19 are extended vertically in order to provide generally for a flat surface to which side portions 22 of cup-shaped mounting elements 23, can be easily welded.

These cup-shaped mounting elements 23 have two opposite side portions 22 and a connecting side portion 24 made from sheet metal stampings and folded into the desired cup-shape. Their bottoms 25 serve as the attaching face for the skin blanket assembly when once the mounting elements are rigidly secured to the skin blanket assemblies. These bottoms include a folded portion 26 and a reinforcing member 27 of thicker sheet metal. Both the portion 26 and the reinforcing member 27 have respectively openings 28 and 29 aligned with one another through which the attaching fastening bolt 30 extends. These fastening bolts 30 have tightening nuts 31 located within the mounting elements and are adapted to be tightened against the reinforcing plate 27. When these clamping nuts 31 are tightened the airfoil structure is brought flush against an attaching face 32 disposed on the aircraft. This attaching face 32 has an opening through which the attaching bolt 30 can be extended and means is provided for inserting the bolt through the opening from the fairing face of this structure and to which access may be had to a second clamping nut 33.

In the side portion 24 of the mounting element 23 there is provided an inwardly extending indentation 34 adapted to receive the end of a reinforcing rib or hollow portions 35 of a channel-shaped element 13. This rib 35 serves to strengthen the channel elements at a location intermediate the inwardly extending portions 14 and 15. In order to make the indention 34 fit more readily over the strengthening rib 35, the strengthening rib is cut to a taper as indicated at 36 and the indentation 34 is formed accordingly to fit this tapered end formation of the rib 35.

In order to strengthen the skin sheet 10 at its attaching end and adjacent to the mounting elements, there is provided on the outer face of the skin, a reinforcing plate 37 welded to the skin 11 as indicated at 38.

When the mounting elements are finally nested in the ends of the channel-shaped elements, their side portions 22 fit flush with the side portions 14 and 15, and the side 24 fits flush with the web portion of the channel-shaped elements. A common weld is made between the side portions 22 of the mounting elements, the side portions 14 and 15 of adjacent reinforcing channel-shaped elements and the flanges 16 of the tubular stringers 17, in the manner as indicated at 39. A further weld is made from the side portion 24 through the web of the channel-shaped element, the skin sheet 11 and the reinforcing plate 37 in a manner as indicated at 40. It will now be apparent that there has been provided an attaching end construction for airfoil structures of the skin-stressed type which is of simple construction and one which can be readily formed by welding tools. It will also appear that with a structure of this type, the mounting elements themselves virtually become a part of the skin blanket structure and that stresses acting through the skin blanket assembly can be readily transmitted through the mounting elements to the adjacent structure of the aircraft through which the airfoil structure is attached.

The cup-shaped elements include a side portion 41 which is considerably more shallow than the side portions 22 and 24, yet has strengthening portions 42 which extend into the airfoil structure for some distance. The side portion 41 so formed, provides for ready access to the clamping nuts 31.

While various changes may be made in the detailed construction, it is to be understood that such changes shall be within the spirit and scope of the present invention as defined by the appended claims.

What is claimed is:

1. In an airfoil structure, a skin blanket joint assembly including a metal skin sheet, supporting means for the skin sheet having spaced hollow portions running spanwise with the skin sheet, alternate hollow portions being flattened adjacent the joint assembly end of the airfoil structure to bring the walls of the hollow portions together to form portions normal to the skin sheet, cup-shaped joint mounting elements having respectively a bottom portion adapted to serve as an attaching face for the structure for attachment to an adjacent joint part, and side wall portions, the hollow end portions intermediate the flattened portions overlapping the mounting elements, each of said mounting elements having side portions indented to receive the intermediate hollow portion, and means for rigidly securing the side portions of the mounting elements to the alternate flattened portions and to the skin sheet.

2. In an airfoil structure, a skin blanket joint assembly including a metal skin sheet, channel-shaped elements for supporting the skin sheet and having respectively web and side portions, the said channel-shaped elements being arranged with their side portions adjacent to each other and extending spanwise of the skin sheet, tubular stringers connected between the side portions of adjacent channel elements, said tubular stringers being flattened near the joint assembly end of the airfoil structure for attachment to an adjacent joint part, mounting elements having bottom and side portions and nested within the channel-shaped elements so that their side portions are in contact with the side portions of the channel-shaped elements and with the flattened areas of the ends of the tubular stringers, and means for securing the side portions of the mounting elements to the channel-shaped supporting elements and to the flattened areas of the tubular stringers.

3. In an airfoil structure, a skin blanket joint assembly including a metal skin sheet, channel-shaped elements for supporting the skin sheet and having respectively web and side portions, the said channel-shaped elements arranged with their side portions adjacent to each other and extended spanwise of the skin sheet, tubular stringers flattened near the joint assembly end of the airfoil structure to bring the walls of the tubular portions together and having radially extending connecting portions disposed between adjacent side portions of the channel-shaped elements, mounting elements having bottom and side portions and nested within the channel-shaped elements so that their side portions are in contact with the side portions of the channel-shaped elements and with the flattened ends of the tubular stringers, and means for securing together the side portions of the mounting and channel shaped elements and of the radially extending connecting portions of the tubular stringers.

MICHAEL WATTER.